US011603420B2

(12) United States Patent
Shin et al.

(10) Patent No.: US 11,603,420 B2
(45) Date of Patent: Mar. 14, 2023

(54) METHOD FOR PREPARING ETHYLENE VINYLACETATE COPOLYMER

(71) Applicant: LG Chem, Ltd., Seoul (KR)

(72) Inventors: Dae Young Shin, Daejeon (KR); Eun Jung Joo, Daejeon (KR); Jin Ho Jung, Daejeon (KR); Choong Hoon Lee, Daejeon (KR); Kyung Soo Park, Daejeon (KR); Yutaek Sung, Daejeon (KR)

(73) Assignee: LG Chem, Ltd.

( * ) Notice: Subject to any disclaimer, the term of this patent is extended or adjusted under 35 U.S.C. 154(b) by 309 days.

(21) Appl. No.: 16/757,533

(22) PCT Filed: Oct. 30, 2018

(86) PCT No.: PCT/KR2018/013026
§ 371 (c)(1),
(2) Date: Apr. 20, 2020

(87) PCT Pub. No.: WO2019/088664
PCT Pub. Date: May 9, 2019

(65) Prior Publication Data
US 2021/0079136 A1    Mar. 18, 2021

(30) Foreign Application Priority Data
Nov. 3, 2017 (KR) ........................ 10-2017-0146281

(51) Int. Cl.
| *C08F 210/02* | (2006.01) |
| *B01J 3/04* | (2006.01) |
| *C08F 2/01* | (2006.01) |
| *C08K 5/14* | (2006.01) |
| *C08L 23/08* | (2006.01) |
| *C08F 4/38* | (2006.01) |

(52) U.S. Cl.
CPC ............ *C08F 210/02* (2013.01); *B01J 3/04* (2013.01); *C08F 2/01* (2013.01); *C08K 5/14* (2013.01); *C08L 23/0853* (2013.01); *B01J 2203/065* (2013.01); *B01J 2219/00051* (2013.01); *B01J 2219/00162* (2013.01); *C08F 2400/02* (2013.01)

(58) Field of Classification Search
USPC ................................................... 526/73, 331
See application file for complete search history.

(56) References Cited

U.S. PATENT DOCUMENTS

| 3,178,404 A * | 4/1965 | Vaughn, Jr. ............ C08F 10/00 526/228 |
| 4,123,600 A | 10/1978 | Kita et al. |
| 2006/0149004 A1 | 7/2006 | Lee et al. |

FOREIGN PATENT DOCUMENTS

| CA | 2784272 A1 | 6/2011 |
| CN | 1800226 A | 7/2006 |
| CN | 106749815 A | 5/2017 |
| CN | 106749821 A | 5/2017 |
| CN | 106916242 A | 7/2017 |
| CN | 106928385 A | 7/2017 |
| JP | 2005272744 A | 10/2005 |
| JP | 2007084743 A | 4/2007 |
| JP | 2013514440 A | 4/2013 |
| KR | 20060055898 A | 5/2006 |
| KR | 20120015551 A | 2/2012 |
| KR | 20120074608 A | 7/2012 |
| KR | 20130058984 A | 6/2013 |
| KR | 101396030 B1 | 5/2014 |
| KR | 20160059445 A | 5/2016 |
| KR | 20160092288 A | 8/2016 |
| KR | 20180055560 A | 5/2018 |
| KR | 20180055561 A | 5/2018 |
| KR | 20180055562 A | 5/2018 |
| KR | 20180055563 A | 5/2018 |

OTHER PUBLICATIONS

Written translation of CN 106749821 A, 25 pages; publication date: May 31, 2017. (Year: 2017).*
Collection of scientific research report papers of Chemical Engineering Shanghai Chemical Research Institute, Mar. 31, 1986. pp. 315-326.
Search Report for Chinese Application No. 201880047586.3 dated Nov. 16, 2021.4 pgs.
International Search Report for Application No. PCT/KR2018/013026, dated Apr. 11, 2019, pp. 1-3.

* cited by examiner

*Primary Examiner* — Fred M Teskin
(74) *Attorney, Agent, or Firm* — Lerner, David, Littenberg, Krumholz & Mentlik, LLP

(57) ABSTRACT

The present invention relates to a method for preparing ethylene vinylacetate copolymer that can improve the mechanical strength of copolymer by controlling the polymerization conditions using an autoclave reactor.

10 Claims, No Drawings

METHOD FOR PREPARING ETHYLENE VINYLACETATE COPOLYMER

CROSS-REFERENCE TO RELATED APPLICATIONS

The present application is a national phase entry under 35 U.S.C. § 371 of International Application No. PCT/KR2018/013026, filed on Oct. 30, 2018 which claims priority from Korean Patent Application No. 10-2017-0146281 filed on Nov. 3, 2017, the disclosures of which are herein incorporated by reference in their entirety.

(a) Field of the Invention

The present invention relates to a method for preparing ethylene vinylacetate copolymer. More specifically, the present invention relates to a method for preparing ethylene vinylacetate copolymer that can improve the mechanical strength of copolymer by controlling the polymerization conditions.

(b) Description of the Related Art

Ethylene vinylacetate is copolymer of ethylene and vinylacetate, the range of use is very wide from hard material to soft material such as hot melt adhesive according to the content of vinylacetate, and it has low crystallinity and excellent low temperature property and impact resistance, compared to polyethylene.

And, ethylene vinylacetate, although it is thermoplastic polymer, has rubber-like properties, excellent electric insulation and voltage withstanding property, and excellent transparency, barrier property, adhesive property, and UV property, and the like, and thus, is being widely used in tubes, packaging material, coating material of electric wire, electric insulation products, tapes, adhesive, various sheets, and the like, and recently, the area of use is being broadened to a protection film of a photoelectric element such as a solar battery or sealing material, and the like.

In general, ethylene vinylacetate copolymer is prepared by introducing ethylene and vinylacetate into an autoclave reactor or a tubular reactor at an optimum ratio, and polymerizing under high temperature/high pressure conditions, and when using an autoclave reactor, ethylene vinylacetate copolymer having a higher content of vinylacetate can be produced.

Meanwhile, although ethylene vinylacetate copolymer has high transparency and adhesion property, it is generally known to have low crystallinity and thus has low mechanical strength, compared to polyethylene.

Recently, ethylene vinylacetate copolymer is utilized a lot as sealing material for protecting the cell of a solar module from moisture and dust, wherein more excellent the mechanical strength, higher the sealing property.

Thus, there is a demand for the studies on the preparation method for improving the mechanical strength of ethylene vinylacetate copolymer.

SUMMARY OF THE INVENTION

It is an object of the present invention to provide a method for preparing ethylene vinylacetate copolymer that controls the polymerization reaction conditions during polymerization using an autoclave reactor, and thus, can provide ethylene vinylacetate copolymer having a low content of long chain branch(LCB) and a high number average molecular weight, thus having improved mechanical properties.

In order to solve the problem, the present invention provides a method for preparing ethylene vinylacetate copolymer comprising a step of polymerizing ethylene monomers and vinylacetate monomers in an autoclave reactor, in the presence of an initiator, wherein the temperature of the upper stage of the autoclave reactor in the polymerization step is 130 to 160° C., the temperature of the lower stage of the autoclave reactor in the polymerization step is 170 to 230° C., and the pressure of the autoclave reactor is 1800 to 2100 bar.

According to the method for preparing ethylene vinylacetate copolymer, ethylene vinylacetate copolymer that has a low content of long chain branch(LCB), thus having a linear structure, and has a high number average molecular weight, thus having excellent mechanical strength, is provided.

DETAILED DESCRIPTION OF THE EMBODIMENTS

The terms used herein are only to explain specific embodiments, and are not intended to limit the present invention. A singular expression includes a plural expression thereof, unless it is expressly stated or obvious from the context that such is not intended. As used herein, the terms "comprise" or "have", etc. are intended to designate the existence of practiced characteristic, number, step, constructional element or combinations thereof, and they are not intended to preclude the possibility of existence or addition of one or more other characteristics, numbers, steps, constructional elements or combinations thereof.

Although various modifications can be made to the present invention and the present invention may have various forms, specific examples will be illustrated and explained in detail below. However, it should be understood that these are not intended to limit the present invention to specific disclosure, and that the present invention includes all the modifications, equivalents or replacements thereof without departing from the spirit and technical scope of the invention.

Hereinafter, a method for preparing ethylene vinylacetate copolymer according to specific embodiments of the invention will be explained in detail.

According to one embodiment of the present invention, a method for preparing ethylene vinylacetate copolymer is provided, which method comprises a step of polymerizing ethylene monomers and vinylacetate monomers in an autoclave reactor in the presence of an initiator, wherein the temperature of the upper stage of the autoclave reactor in the polymerization step is 130 to 160° C., the temperature of the lower stage of the autoclave reactor in the polymerization step is 170 to 230° C., and the pressure of the autoclave reactor is 1800 to 2100 bar.

Ethylene vinylacetate(EVA) copolymer may be prepared in an autoclave reactor or a tubular reactor, and in general, ethylene vinylacetate prepared in an autoclave reactor has wide molecular weight distribution, and ethylene vinylacetate prepared in a tubular reactor has narrow molecular weight distribution, and thus, it can be prepared by selecting a reactor according to the use.

Meanwhile, in case an autoclave reactor where back-mixing occurs is used, compared to the case of using a tubular reactor where mixing occurs by turbulent plug flow, uniform and high reaction temperature can be maintained, and thus, ethylene vinylacetate copolymer having a higher vinylacetate content can be produced.

In the case of using an autoclave reactor, although the reaction conditions vary according to the content of vinylacetate, a polymerization reaction is generally conducted at a pressure of 1700 to 2200 bar and a temperature of 150 to 240° C.

In order to increase flexibility and elasticity, the content of vinylacetate is required to be 15 wt % or more, but if the content of vinylacetate introduced into a reactor increases, a part of vinylacetate may act as a chain transfer agent, and thus, the molecular weight of ethylene vinylacetate may decrease, the melt index(MI) may increase, and the mechanical properties such as tensile strength may be deteriorated.

The present inventors repeated studies on the preparation method for providing ethylene vinylacetate copolymer comprising a high content of vinylacetate, in which mechanical strength is not deteriorated, and the present invention is based on the discovery that when the temperature of the upper stage and the temperature of the lower stage of an autoclave reactor are respectively adjusted within a certain range, ethylene vinylacetate copolymer that has a low content of LCB(long chain branch) included therein, thus exhibiting a linear structure, and has a high number average molecular weight, thus exhibiting excellent mechanical strength, can be prepared.

Thus, the method for preparing excellent ethylene vinylacetate copolymer according to one embodiment of the present invention can prepare ethylene vinylacetate copolymer having excellent mechanical properties such as tensile strength, and the like, even if using an autoclave reactor, by controlling the polymerization conditions by separately setting the temperatures of the upper stage and the lower stage of the reactor and controlling the reaction pressure, using an autoclave reactor.

As used herein, a temperature of the upper stage of a reactor means a temperature measured at a height between 70 to 100% from the bottom, when the total height of the autoclave reactor is 100%, and a temperature of the lower stage of a reactor means a temperature measured at a height between 0 to 40% from the bottom of the autoclave reactor.

More specifically, the preparation method according to one embodiment comprises a step of polymerizing ethylene monomers and vinylacetate monomers in an autoclave reactor in the presence of an initiator, wherein the temperature of the upper stage of the autoclave reactor in the polymerization step is 130 to 160° C., the temperature of the lower stage of the autoclave reactor in the polymerization step is 170 to 230° C., and the pressure of the autoclave reactor is 1800 to 2100 bar.

The initiator used in the preparation method of ethylene vinylacetate copolymer of the present invention may include organic peroxide-based low temperature initiators and high temperature initiators.

As used herein, the low temperature initiator means an initiator capable of initiating and/or promoting a reaction between the ethylene monomers and the vinylacetate monomers at a temperature of 130 to 160° C., and the high temperature initiator means an initiator capable of initiating and/or promoting the reaction at a temperature of 170° C. to 230° C.

In general, in case only one initiator is used in the preparation of ethylene vinylacetate copolymer, when the operation temperature is too low, the initiator cannot react, and when the reaction temperature is too high, the initiator may be decomposed before polymerizing copolymer, and thus, the efficiency of the initiator may decrease or a runaway reaction may occur.

Meanwhile, according to the preparation method of ethylene vinylacetate copolymer of one embodiment of the present invention, by progressing polymerization while differently setting the temperatures of the upper stage and the lower stage of a reactor respectively at a low temperature and a high temperature, and using organic peroxide-based low temperature initiator and high temperature initiator in combination as the initiator, the degree of the polymerization reaction can be controlled according to each temperature region.

According to one embodiment of the present invention, the low temperature initiator and the high temperature initiator may be combined at a weight ratio of about 5:95 to 90:10, preferably about 20:80 to 70:30.

The low temperature initiator can initiate a polymerization reaction at a lower temperature than common high pressure radical polymerization reaction temperature, and for example, one or more compounds selected from the group consisting of DIPND (1,4-di(2-neodecanoylperoxyisopropyl)benzene), CUPND(Cumylperoxy neodecanoate), SBPC(Di(sec-butyl) peroxydicarbonate), NBPC(Di(n-butyl)peroxydicarbonate), EHP(Di(2-ethylhexyl) peroxydicarbonate), TAPND(Tert-amylperoxyneodecanoate) and TBPND(Tert-butyl peroxyneodecanoate) may be used.

And, the high temperature initiator can initiate a polymerization reaction at a higher temperature than common high pressure radical polymerization reaction temperature, and for example, one or more compounds selected from the group consisting of TAPPI(Tert-amylperoxy pivalate), TBPPI(Tert-butylperoxy pivalate), INP(Di(3,5,5-trimethylhexanoyl) peroxide), TAPEH(Tert-amylperoxy 2-ethylhexanoate), TBPEH(Tert-butylperoxy 2-ethylhexanoate), TBPIB(Tert-butyl peroxy-isobutyrate), TBPIN(Tert-butylperoxy-3,5,5-trimethylhexanoate) and TBPA(Tert-butylperoxyacetate) may be used.

And, the low temperature initiator and the high temperature initiator may be used while being diluted in a hydrocarbon solvent at a concentration of 20 to 80 wt %, preferably 30 to 70 wt %. Wherein, as the hydrocarbon solvent, for example, one or more selected from the group consisting of n-decane, n-octane, iso-dodecane, and iso-octane may be used, or Isopar series solvents, which are the commercial products of mixed hydrocarbons, may be used.

And, the total amount of the initiators used including the low temperature initiator and the high temperature initiator may be about 60 ppm or more, or about 70 ppm or more, or about 80 ppm or more, and about 170 ppm or less, or about 160 ppm or less, or about 150 ppm or less, based on the total weight of the monomers including ethylene monomers and vinylacetate monomers. If the amount of the initiators used is too small, a reaction may not be properly progressed, and if it is too large, runaway reactions may be generated by non-ideal reactions.

In the preparation method of ethylene vinylacetate copolymer according to the present invention, by controlling the total pressure of the autoclave reactor, the temperature of the upper stage of the reactor, and the temperature of the lower stage of the reactor within specific ranges, the content of long chain branches in the prepared ethylene vinylacetate copolymer may be decreased, and the number average molecular weight may be increased to improve mechanical strength such as tensile strength.

The temperature of the lower stage of the autoclave reactor, and the temperature of the upper stage of the reactor respectively mean the temperatures measured by thermocouples installed at the lowest stage of the reactor and the highest stage of the reactor.

And, the pressure of the autoclave reactor means a pressure measured by a pressure sensor inside the reactor.

Particularly, by controlling the temperature of the upper stage of the autoclave reactor to 130 to 160° C. and the temperature of the lower stage to 170 to 230° C., and controlling the pressure range of the reactor to 1800 to 2100 bar, ethylene vinylacetate copolymer having more excellent mechanical properties such as tensile strength, and the like can be prepared with a high conversion rate.

More specifically, the temperature of the upper stage of the autoclave reactor is set up at about 130° C. or more, or about 135° C. or more, and about 160° C. or less, or about 155° C. or less. If the temperature of the upper stage of the reactor is less than 130° C., a reaction may not be properly progressed, and if the temperature of the upper stage of the reactor is greater than 160° C., LCB content may increase to deteriorate mechanical properties.

And, the temperature of the lower stage of the autoclave reactor is set up at about 170° C. or more, about 190° C. or more, or about 200° C., or about 210° C. or more, and about 230° C. or less, or about 225° C. or less, or about 220° C. or less. If the temperature of the lower stage of the reactor is less than 170° C., polymerization conversion rate may be low, and if the temperature of the lower stage of the reactor is greater than 230° C., a decomposition reaction may occur.

And, in the polymerization step, the pressure of the reactor may be about 1800 to about 2100 bar, or about 1800 to about 2000 bar. If the pressure of the reactor is less than 1800 bar, the amount of the initiator used for polymerization may increase, which is not preferable in terms of production cost, and if it is greater than 2100 bar, it may be difficult to control polymerization stability, thus generating reactor safety problem.

And, in the preparation method of ethylene vinylacetate copolymer of one embodiment, the vinylacetate monomers may be included in the content of about 15 to about 40 parts by weight, preferably about 20 to about 30 parts by weight, based on 100 parts by weight of the sum of the ethylene monomers and vinylacetate monomers.

As explained above, by controlling the total pressure of the autoclave reactor, the temperature of the upper stage of the reactor, and the temperature of the lower stage of the reactor within specific ranges, ethylene vinylacetate copolymer that has a decreased content of long chain branch, and has a high number average molecular weight, and thus, has excellent tensile strength, can be prepared.

According to one embodiment of the present invention, the ethylene vinylacetate copolymer obtained by the above preparation method may have a content of long chain branch(LCB) of about 2 or less, for example, about 2 or less, or about 1.5 or less, or about 1.0 or less, or about 0.9 or less, or about 0.85 or less, per a carbon number of 1,000. And, the lower limit is not specifically limited, but it may be about 0.1 or more, or about 0.2 or more, or about 0.3 or more, or about 0.4 or more. The content of long chain branch is related to the molecular weight distribution and tensile strength of ethylene vinylacetate copolymer, and if the content of long chain branch is as small as 2 or less, as in the copolymer of one embodiment, the copolymer may have narrow molecular weight distribution and high tensile strength, and thus, can be very preferably used for the applications requiring mechanical strength such as sealing, and the like.

Meanwhile, the content of long chain branch(LCB) is measured using 13C-NMR. Specifically, a sample is dissolved in a TCE-$d_2$(1,1,2,2-Tetrachloroethane-$d_2$) solvent and 13C-NMR is conducted, and the number of branches having a carbon number of 6 or more included per a carbon number of 1,000 is analyzed and the sum is calculated.

And, the number average molecular weight(Mn) of the ethylene vinylacetate copolymer is about 14,000 g/mol or more, or about 14,500 g/mol or more, and about 19,500 g/mol or less, or about 19,000 g/mol or less, which is higher than those of common ethylene vinylacetate copolymers.

And, the weight average molecular weight(Mw) of the ethylene vinylacetate copolymer is about 40,000 g/mol or more, about 42,000 g/mol or more, or about 44,000 g/mol or more, and about 64,000 g/mol or less, or about 62,000 g/mol or less, or about 60,000 g/mol or less.

And, the polydispersity index(PDI) of the ethylene vinylacetate copolymer is as narrow as about 3 or more, or about 3.1 or more or about 3.2 or more, and about 4.5 or less, or about 4.4 or less, or about 4.3 or less. The polydispersity index(PDI) means a rate of weight average molecular weight (Mw) to number average molecular weight(Mn) (Mw/Mn), and if the polydispersity index is greater than 4.5, it is not preferable because tensile strength may decrease.

In the present invention, the polydispersity index, weight average molecular weight, and number average molecular weight may be measured using a size exclusion chromatograpy(SEC). Specifically, an ethylene vinylacetate copolymer sample is dissolved in 1,2,4-TCB(Trichlorobenzene), and then, the weight average molecular weight(Mw) and the number average molecular weight(Mn) are respectively obtained at a temperature of 125° C. and a flow rate of 1 ml/min using 1,2,4-TCB as a mobile phase, and the polydispersity index(rate of weight average molecular weight/number average molecular weight) is calculated therefrom. Wherein, as the column of SEC, PLgel 10 μm Mixed-B (manufactured by Agilent), and the like may be used.

And, the ethylene vinylacetate copolymer may exhibit good tensile strength,

The present invention will be explained in more detail in the following examples. However, these examples are presented only as the illustrations of the present invention, and the scope of the present invention is not limited thereby.

EXAMPLE

Examples and Comparative Examples

Under the process conditions shown in the following Table 1, ethylene vinylacetate copolymer was prepared in an autoclave reactor.

TABLE 1

| Process conditions | Example 1 | Example 2 | Example 3 | Example 4 | Comparative Example 1 | Comparative Example 2 |
|---|---|---|---|---|---|---|
| VA content (parts by weight)* | 28 | 28 | 28 | 28 | 28 | 28 |
| Kind and content of initiator (ppm) | TBPND + TBPPI 126 ppm | TBPND + TBPPI 141 ppm | TBPND + TBPPI 108 ppm | TBPND + TBPPI 92 ppm | TBPND + TBPPI 173 ppm | TBPND + TBPPI 249 ppm |
| Pressure (bar) | 1800 | 1800 | 2000 | 2000 | 1700 | 1800 |
| Temperature of the upper stage of reactor (° C.) | 150 | 140 | 140 | 150 | 140 | 120 |
| Temperature of the lower stage of reactor (° C.) | 220 | 210 | 220 | 210 | 220 | 220 |

*VA content(parts by weight) means the content(parts by weight) of vinylacetate, when the sum of ethylene monomers and vinylacetate monomers is 100 parts by weight.

Experimental Example

The properties of the ethylene vinylacetate copolymers prepared in Examples 1 to 4 and Comparative Examples 1 to 2 were measured as follows, and shown in Table 2.

(1) LCB: A copolymer sample was dissolved in TCE-$d_2$ (1,1,2,2-Tetrachloroethane-$d_2$) and $^{13}$C-NMR was conducted, and the number of branches having a carbon number of 6 or more included per a carbon number of 1,000 was analyzed and the sum was calculated.

(2) Polydispersity index(PDI), number average molecular weight(Mn), weight average molecular weight(Mw):

Measured using size exclusion chromatography(SEC). The measurement was conducted using a PL-GPC equipment(manufactured by Agilent) using a column of PLgel 10 μm Mixed-B (manufactured by Agilent), with 1,2,4-TCB (1,2,4-Trichlorobenzene) as a mobile phase at a temperature of 125° C. and a flow rate of 1 ml/min. Specifically, the ethylene vinylacetate copolymer samples of Examples and Comparative Examples were respectively dissolved in 1,2, 4-TCB at a concentration of 10 mg/10 mL, and then, fed in an amount of 200 μL, the weight average molecular weight (Mw) and the number average molecular weight(Mn) were derived using a calibration curve formed using a styrene standard, and the polydispersity index(rate of weight average molecular weight/number average molecular weight) was calculated therefrom. Wherein, as the polystyrene standard, 9 kinds having molecular weights of 9,475,000, 597, 500, 19,920, 3,507,000, 224,900, 9,960, 1,956,000, 74,800, 2,980 were used.

Referring to Table 2, it was confirmed that the ethylene vinylacetate copolymers of Examples 1 to 4, prepared by controlling the pressure of a reactor, the temperature of the upper stage of a reactor, and the temperature of the lower stage of a reactor within specific ranges according to the present invention, include low contents of long chain branches, and have high number average molecular weights, and thus, have improved tensile strengths.

Meanwhile, in the case of Comparative Example 1 wherein the pressure of a reactor was lower than 1800 bar, the amount of the initiator used for polymerization was increased, and the number average molecular weight was less than 14,000 g/mol, which was lower than those of Examples.

In the case of Comparative Example 2 wherein the temperature of the upper stage of the reactor was set up at 120° C., the amount of the initiator introduced was abnormally increased to render the reaction unstable, and the number average molecular weight was very low.

What is claimed is:

1. A method for preparing ethylene vinylacetate copolymer comprising:
polymerizing ethylene monomers and vinylacetate monomers in an autoclave reactor, in the presence of an initiator,
wherein a temperature of an upper stage of the autoclave reactor during the polymerizing step is 130 to 160° C.,

TABLE 2

| | Example 1 | Example 2 | Example 3 | Example 4 | Comparative Example 1 | Comparative Example 2 |
|---|---|---|---|---|---|---|
| LCB (number/1000 C) | 0.84 | 0.71 | 0.73 | 0.63 | 0.88 | 0.96 |
| Number average molecular weight (g/mol) | 14,985 | 14,854 | 16,184 | 17,742 | 13,386 | 12,140 |
| Weight average molecular weight (g/mol) | 51,680 | 46,405 | 54,508 | 59,287 | 42,849 | 39,554 |
| Polydispersity index | 3.45 | 3.12 | 3.37 | 3.34 | 3.20 | 3.26 | a temperature of a lower stage of the autoclave reactor during the polymerizing is 170 to 230° C., and a pressure of the autoclave reactor is 1800 to 2100 bar, wherein the lower stage and upper stage are positioned adjacent to one another.

2. The method for preparing ethylene vinylacetate copolymer according to claim 1, wherein a number average molecular weight(Mn) of the ethylene vinylacetate copolymer is 14,000 to 19,500 g/mol.

3. The method for preparing ethylene vinylacetate copolymer according to claim 1, wherein the ethylene vinylacetate copolymer has a content of long chain branches of 0.1 to 2 per a carbon number of 1,000.

4. The method for preparing ethylene vinylacetate copolymer according to claim 1, wherein the initiator includes a low temperature initiator and a high temperature initiator.

5. The method for preparing ethylene vinylacetate copolymer according to claim 4, wherein the low temperature initiator and the high temperature initiator are included at a weight ratio of 5:95 to 90:10.

6. The method for preparing ethylene vinylacetate copolymer according to claim 4, wherein the low temperature initiator includes one or more of DIPND (1,4-di(2-neodecanoylperoxyisopropyl)benzene), CUPND(Cumylperoxy neodecanoate), SBPC(Di(sec-butyl) peroxydicarbonate), NBPC(Di(n-butyl)peroxydicarbonate), EHP(Di(2-ethylhexyl) peroxydicarbonate), TAPND(Tert-amylperoxyneodecanoate) or TBPND(Tert-butyl peroxyneodecanoate).

7. The method for preparing ethylene vinylacetate copolymer according to claim 4, wherein the high temperature initiator includes one or more of TAPPI(Tert-amylperoxy pivalate), TBPPI(Tert-butylperoxy pivalate), INP(Di(3,5,5-trimethylhexanoyl) peroxide), TAPEH(Tert-amylperoxy 2-ethylhexanoate), TBPEH(Tert-butylperoxy 2-ethylhexanoate), TBPIB (Tert-butylperoxy-isobutyrate), TBPIN (Tert-butylperoxy-3,5,5-trimethylhexanoate) or TBPA(Tert-butylperoxyacetate).

8. The method for preparing ethylene vinylacetate copolymer according to claim 1, wherein the vinylacetate monomers are included in a content of 15 to 40 parts by weight, based on 100 parts by weight of a sum of ethylene monomers and vinylacetate monomers.

9. The method for preparing ethylene vinylacetate copolymer according to claim 1, wherein the ethylene vinylacetate copolymer has a polydispersity index (PDI, Mw/Mn) of 3 to 4.5.

10. The method for preparing ethylene vinylacetate copolymer according to claim 1, wherein the ethylene vinylacetate copolymer has a weight average molecular weight (Mw) of 40,000 to 64,000 g/mol.

* * * * *